United States Patent Office
3,532,606
Patented Oct. 6, 1970

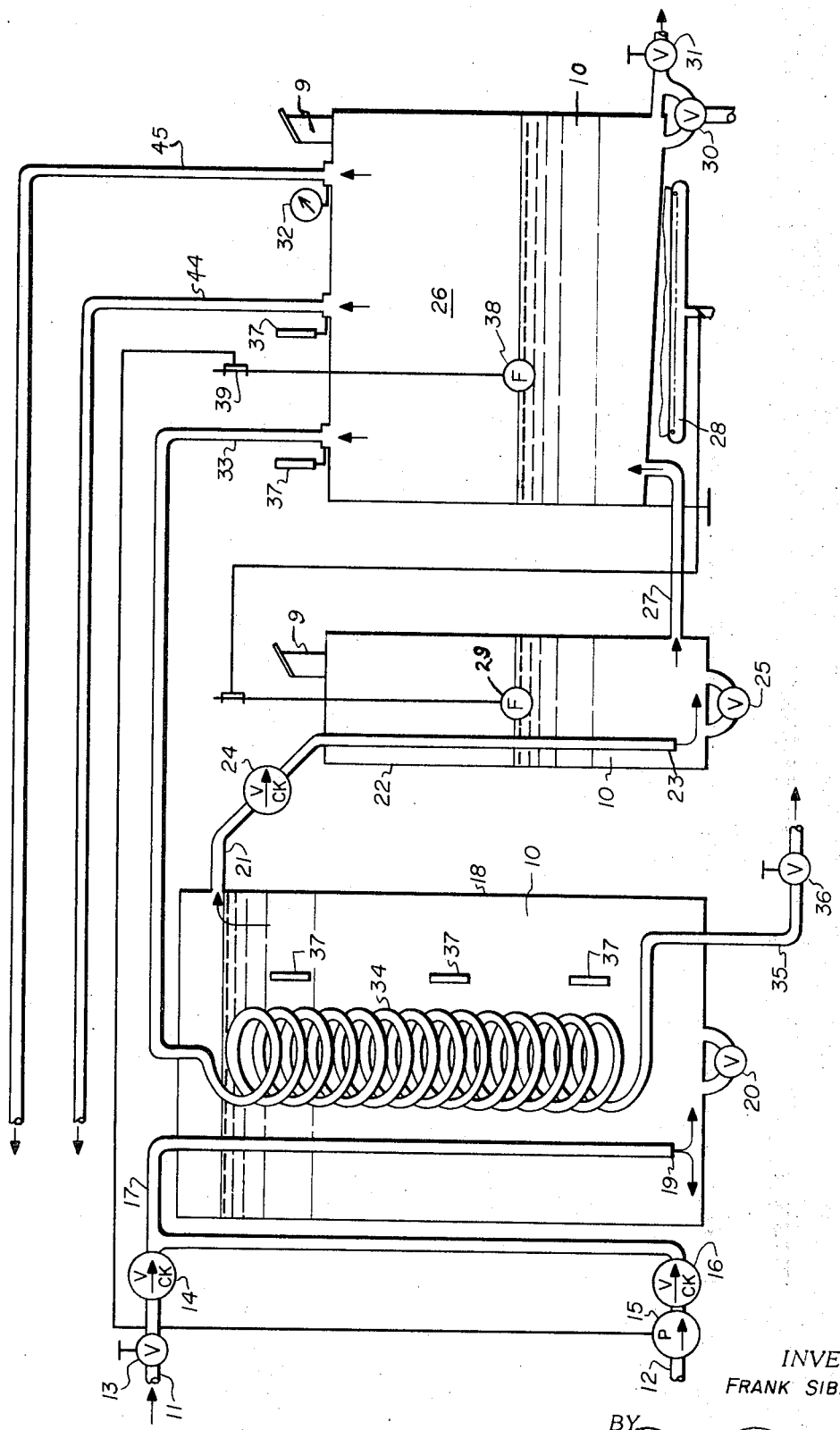

3,532,606
WATER PURIFICATION APPARATUS WITH THREE
CHAMBERS AND CONTROLS
Frank Sibert, 85 Washington St.,
East Orange, N.J. 07050
Filed Feb. 29, 1968, Ser. No. 709,324
Int. Cl. B01d 3/42
U.S. Cl. 202—180                             1 Claim

ABSTRACT OF THE DISCLOSURE

A purifier for salt sea water wherein the water is conducted from a supply tank, to a control tank, to a boiler, where it is vaporized, leaving behind its salts as a residue, and the heated or condensed vapor is passed through the supply tank in heat exchange relation with the sea water therein to temperature pre-condition it for distillation.

The need for pure water is increasing in many parts of the world due to the increasing demands of agriculture and growing populations. It is only natural that the most obvious source of pure water be considered: the salt oceans of the world. The desalting of salt water is difficult and costly and requires, in some instances, the use of complex and expensive equipment as well as the consumption of fuel for the production of heat to carry out the process. Often the desalting process requires the application of high temperatures, and operates under high pressure conditions which makes it necessary for the apparatus to be strong in order to resist the disruptive effects of such high pressure. The yield of pure fresh water is often very slowly realized, and the degree of purity may leave something to be desired, due to the presence of impurities and salt residues.

It has been found that a relatively simple, inexpensive apparatus may be built for the purpose of desalting sea water; it operates at relatively low temperature and at low pressure, and it will yield a high percentage return of pure water, can be constructed, and can be made to operate with a high degree of economy, in part by reason of the utilization of the heat of the distillate which might normally be wasted.

Such an apparatus is shown in the drawing in which the figure shows a plan view of the apparatus.

Referring now to the drawing in detail, the apparatus provides an input conduit 11 for a high level input, and a conduit 12 for a low level input. At the high level conduit 11, there is a control valve 13. Beyond this control valve 13, there is a check valve 14 to prevent reverse flow. At the low level input conduit 12, there is a pump 15 and a check valve 16, so that, regardless of low level or high level source, the cold salt sea water is conducted through the conduit 17 into a first or supply tank 18, where it is discharged at the bottom of the tank 18 from the end 19 of the conduit 17. The tank 18 is provided with a drain valve 20 to enable the discharge of fluid contents or sediment or residue from the tank 18.

Near the top of the tank 18, there is a discharge conduit 21, through which the salt sea water is delivered to a control tank 22. The control or second tank 22 receives the heated salt sea water 10 from the bottom end 23 of the conduit 21. A check valve 24 in the conduit 21 prevents any reverse flow. At the bottom of the control tank 22, there is a valve 25 to permit the draining of the tank 22 of its fluid or residue contents. The control tank 22 discharges into a boiler tank 26, through the conduit 27, which enters the bottom of the boiler tank 26.

A burner 28 is positioned under the boiler tank 26. The burner is controlled by a float 29 in the control tank 22 so that if the water supply to the control tank fails, the burner will be cut off; when the water level in the control tank 22 (and necessarily in the boiler tank 26) is a a pre-determined satisfactory level, the float 29 keeps the supply of fuel flowing to the burner 28.

The control tank 22 and the boiler tank 26 are provided with blow off safety valves 9. The boiler tank 26 is provided with a sloping floor in order to encourage the accumulation of undissolved residues at a convenient discharge point. At its lowest point, the boiler tank 26 is provided with a discharge valve 30, so that the fluid contents of the boiler tank 26 or the residue may be discharged. A second discharge valve 31 enables withdrawal from the boiler tank 26 of its fluid contents without residues that may have accumulated in the vicinity of the valve 30. The boiler tank 26 is provided with a pressure registering gauge 32. The boiler tank 26 is provided with three vapor discharge conduits 33, 44, 45. The first conduit 33 connects to a helix 34 which is immersed in the sea water 10 in the first tank 18. The water vapor condensed in this helix 34 is discharged through a conduit 35 governed by the valve 36. The effluent is pure salt-free water. The helix 34 functions as a heat exchange device whereby the sea water 10 in the first tank 18 is raised in temperature so that temperature preconditioned salt sea water (heated) enters the control tank 22, and the boiler tank 26. Much of the heat of the condensed water is thereby used rather than wasted. Thermometers 37 are provided in the first tank 18 and at the entrance to the conduits 33 and 44.

The steam discharge conduits 44, 45 may connect with additionl helixes (not shown) in the first tank 18 or in additional auxiliary tanks identical with the first tank 18, which tanks would also feed preheated salt sea water into the control tank 22.

Alternatively, the discharge conduit 45 may be used to conduct the steam to a turbine or other device for driving a generator. A float 38 in the boiler tank 26 controls the level of water in that tank by operating a switch 39, which turns the pump 15 on and off to meet the demands for sea water 10 in the boiler tank 26.

The production of pure water from salt sea water proceeds as steam is produced in the boiler tank 26 and the vapors condense in the helix 34. The pure water is discharged though the valve 36. The production proceeds in a rapid, continuous and economical manner with the efficient use of heat applied, and the system operates at relatively low pressures.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claim, although not specifically catalogued herein.

What is claimed is:
1. A water purifier comprising
(a) a vertically elongated first tank,
(b) a second tank,
(c) a first conduit connecting the upper level of the first tank to the second tank, said first conduit terminating within and near the bottom of the second tank,
(d) a boiler,
(e) a second conduit connected between the bottom of the second tank and the bottom of the boiler,
(f) a third conduit connecting the vapor space of the boiler ot the first tank at the upper end of the boiler and at the upper end of the first tank,
(g) a helix in the first tank connected to the third conduit from the boiler for receiving and condensing the vapors form the boiler,
(h) a pump,

(i) a fourth conduit connecting the pump to the first tank and for feeding impure liquid thereto, said fourth conduit terminating within and near the bottom of the first tank, (j) the helix in the first tank extending toward the bottom thereof and positioned for heat exchange between contents of the helix and contents of the first tank, (k) sensing means in the boiler responsive to the liquid level therein, (l) means responsive to said sensing means for activating said pump, (m) heating means for heating said boiler, (n) means in said second tank for measuring the liquid level therein, (o) means responsive to said liquid level measuring means to control the rate of heating of said heating means, (p) residue discharge means located in the first tank, second tank and boiler, below the bottom of each tank and the boiler, (q) and means in each of said residue discharge means to control the flow of said residue, (r) wherein fresh water is recovered from the outlet of the helix passing downwardly through said first tank.

References Cited

UNITED STATES PATENTS

| | | | |
|---|---|---|---|
| 108,328 | 10/1870 | Purdy | 202—185.5 |
| 284,011 | 8/1883 | Hernick | 208—185.5 |
| 389,160 | 9/1888 | Marr | 202—185.2 |
| 482,581 | 9/1892 | Mann | 202—185.6 |
| 616,277 | 12/1898 | Todd et al. | 202—185.6 |
| 771,832 | 10/1904 | Rochlitz | 202—185.5 |
| 1,881,718 | 10/1932 | Lawrie | 202—185.6 |
| 3,438,869 | 4/1969 | Saavedra | 203—11 |
| 1,525,762 | 2/1925 | Wellman | 137—394 |
| 2,140,623 | 12/1938 | Hetzer | 202—206 |
| 3,055,810 | 9/1962 | Skow | 202—181 |
| 3,074,686 | 1/1963 | Cain | 137—394 |

WILBUR L. BASCOMB, Jr., Primary Examiner

U.S. Cl. X.R.

202—181, 185, 206; 203—1, 2, 10, 22